United States Patent
Ochiai (10) Patent No.: US 10,337,552 B2
(45) Date of Patent: Jul. 2, 2019

(54) METHOD OF MANUFACTURING WASHER AND WASHER

(71) Applicant: Taiho Kogyo Co., Ltd., Toyota-shi, Aichi (JP)

(72) Inventor: Hirokazu Ochiai, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 0 days.

(21) Appl. No.: 15/735,774

(22) PCT Filed: Apr. 26, 2016

(86) PCT No.: PCT/JP2016/063066
§ 371 (c)(1),
(2) Date: Dec. 12, 2017

(87) PCT Pub. No.: WO2016/203852
PCT Pub. Date: Dec. 22, 2016

(65) Prior Publication Data
US 2018/0172061 A1 Jun. 21, 2018

(30) Foreign Application Priority Data
Jun. 15, 2015 (JP) .................. 2015-120134

(51) Int. Cl.
*F16B 43/00* (2006.01)
*B21D 11/20* (2006.01)
(Continued)

(52) U.S. Cl.
CPC .............. *F16B 43/00* (2013.01); *B21D 11/10* (2013.01); *B21D 11/20* (2013.01); *B21D 53/20* (2013.01);
(Continued)

(58) Field of Classification Search
CPC .......... F16B 43/00; E04D 5/145; B21D 11/20; B21D 53/20
(Continued)

(56) References Cited

U.S. PATENT DOCUMENTS

| | | | | | |
|---|---|---|---|---|---|
| 1,754,466 A | * | 4/1930 | Hosking | ............... | B21D 53/20 24/20 EE |
| 1,845,272 A | * | 2/1932 | Hosking | ............... | B21D 53/20 411/531 |

(Continued)

FOREIGN PATENT DOCUMENTS

| CN | 1639478 A | 7/2005 |
|---|---|---|
| EP | 1798441 A1 | 6/2007 |

(Continued)

OTHER PUBLICATIONS

Office Action dated Jul. 9, 2018, by the Chinese Patent Office in corresponding Chinese Patent Application No. 201680034485.3, and an English translation thereof.

(Continued)

*Primary Examiner* — Roberta S Delisle
(74) *Attorney, Agent, or Firm* — Buchanan Ingersoll & Rooney PC (57) ABSTRACT

A method of manufacturing a washer capable of improving a material yield is provided. The method includes: a preparation step of preparing a longitudinal member which includes an upper corrugated portion and a lower corrugated portion including crest portions formed on at least one of an upper surface and a lower surface and valley portions continuous to the crest portions in the right-left direction; and a deformation step of deforming the longitudinal member such that the upper surface and the lower surface are arcuate as viewed in the direction from the front to the rear.

8 Claims, 9 Drawing Sheets

(51) Int. Cl.
  *B21D 53/20* (2006.01)
  *B21D 11/10* (2006.01)
  *B21F 37/04* (2006.01)
  *B21D 13/00* (2006.01)
  *B21D 28/06* (2006.01)

(52) U.S. Cl.
  CPC .............. *B21F 37/04* (2013.01); *B21D 13/00* (2013.01); *B21D 28/06* (2013.01)

(58) Field of Classification Search
  USPC ........................... 411/531, 543, 545; 72/380
  See application file for complete search history.

(56) References Cited

U.S. PATENT DOCUMENTS

| | | | | |
|---|---|---|---|---|
| 1,963,027 | A * | 6/1934 | Olson | B21D 53/20 411/165 |
| 2,228,284 | A * | 1/1941 | Olson | F16B 39/24 411/134 |
| 2,235,300 | A * | 3/1941 | Ramey | F16B 15/00 411/464 |
| 2,495,337 | A * | 1/1950 | Lindham | B65D 9/34 403/280 |
| 2,558,132 | A * | 6/1951 | Green | E04B 1/49 403/280 |
| 3,221,847 | A * | 12/1965 | Attwood | F16B 2/005 403/408.1 |
| 3,485,518 | A * | 12/1969 | Heise | E04B 1/49 403/283 |
| 3,591,210 | A * | 7/1971 | Heise | E04B 1/49 403/384 |
| 4,744,187 | A * | 5/1988 | Tripp | E04D 5/143 411/179 |
| 4,751,802 | A * | 6/1988 | Whitman | E04D 5/148 52/410 |
| 4,752,178 | A * | 6/1988 | Greenhill | F16B 21/18 403/326 |
| 5,008,572 | A * | 4/1991 | Marshall | H02K 3/522 310/216.004 |
| 5,473,794 | A * | 12/1995 | Kobayashi | G06F 1/1616 16/319 |
| 5,639,074 | A * | 6/1997 | Greenhill | F16B 1/328 267/158 |
| 6,062,790 | A * | 5/2000 | Huang | F16B 5/02 411/107 |
| 6,250,618 | B1 * | 6/2001 | Greenhill | F16F 1/027 267/160 |
| 6,388,351 | B1 | 5/2002 | Fisher et al. | |
| 6,726,395 | B2 * | 4/2004 | Yu | F16B 7/182 403/296 |
| 8,454,290 | B2 * | 6/2013 | Schaser | F16B 5/0241 248/576 |
| 8,875,683 | B2 * | 11/2014 | Holt | F16F 1/328 123/470 |
| 2005/0089385 | A1 * | 4/2005 | Lin | F16B 39/24 411/154 |
| 2005/0232525 | A1 | 10/2005 | Faust et al. | |
| 2010/0021261 | A1 * | 1/2010 | Bianchi | F16B 13/0875 411/78 |

FOREIGN PATENT DOCUMENTS

JP  2004-169793 A  6/2004
WO  2010149457 A1  12/2010

OTHER PUBLICATIONS

The extended European Search Report dated Oct. 26, 2018, by the European Patent Office in corresponding European Application No. 16811327.2. (7 pages).

* cited by examiner

METHOD OF MANUFACTURING WASHER AND WASHER

TECHNICAL FIELD

The present invention relates to a method of manufacturing a washer for receiving a load and a technique of a washer.

BACKGROUND ART

Conventionally, a washer for receiving a load is formed by punching a forming material having a substantially plate shape with a forming die. For example, a washer is formed as described in Patent Literature 1.

Figure 9:
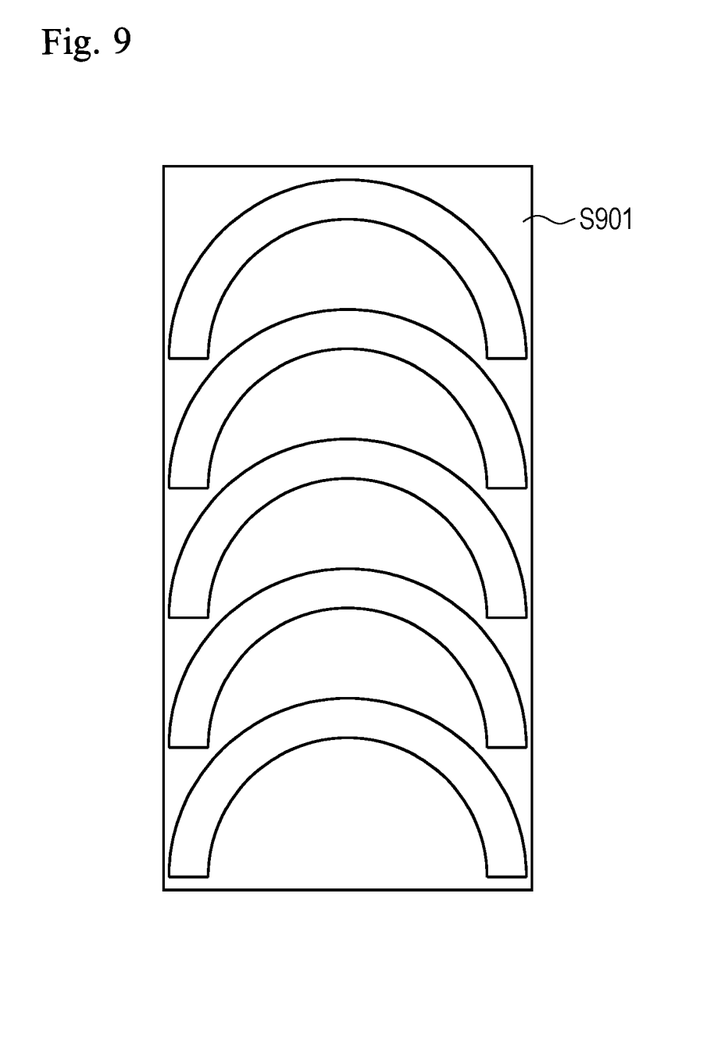
FIG. 9 is a view illustrating a scrap which is a punched forming material.

However, with the technique disclosed in Patent Literature 1, most of the forming material is wasted because a ring shape is punched out in the forming material. In addition, for example, even in a case where semicircular shapes are punched out in a forming material and two semicircular members are joined, most of the forming material is wasted, and it can hardly be said that a material yield can be sufficiently improved (see a scrap S901 illustrated in FIG. 9). As described above, the conventional technique is disadvantageous in that the material yield is poor.

CITATION LIST

Patent Literature

Patent Literature 1: JP 2001-82457 A

SUMMARY OF INVENTION

Technical Problem

The present invention has been made in view of the above circumstances, and the problem to be solved by the present invention is to provide a method of manufacturing a washer and a washer capable of improving a material yield.

Solution to Problem

The problem to be solved by the present invention is as described above. Next, means for solving the problem will be described.

A method of manufacturing a washer according to the present invention includes: a preparation step of preparing a longitudinal member which includes a corrugated portion that has a crest portion formed on each of one side surface and another side surface in a lateral direction and a valley portion continuous to the crest portion in the longitudinal direction, the crest portion formed on the one side surface and the valley portion formed on the other side surface having identical shapes, and the valley portion formed on the one side surface and the crest portion formed on the other surface having identical shapes; and a deformation step of deforming the longitudinal member such that the one side surface and the other side surface are arcuate as viewed in one direction orthogonal to the lateral direction and to the longitudinal direction.

In the method of manufacturing a washer according to the present invention, the corrugated portion is formed to extend from one end to the other end in the longitudinal direction on at least one of the one side surface and the other side surface of the longitudinal member prepared in the preparation step.

In the method of manufacturing a washer according to the present invention, the valley portion of the longitudinal member prepared in the preparation step is formed such that a tip portion of the valley portion has an arc shape as viewed in the one direction.

In the method of manufacturing a washer according to the present invention, the corrugated portion of the longitudinal member prepared in the preparation step is formed into a sinusoidal shape as viewed in the one direction.

In the method of manufacturing a washer according to the present invention, in the deformation step, the longitudinal member is deformed so that the corrugated portion is disposed at least on an outer peripheral side.

In the method of manufacturing a washer according to the present invention, the one side surface and the other side surface of the longitudinal member prepared in the preparation step are formed such that a distance along the lateral direction from the one side surface to the other side surface is constant from the one end to the other end of the longitudinal member in the longitudinal direction.

In the method of manufacturing a washer according to the present invention, the longitudinal member prepared in the preparation step includes a bimetal material made of a plurality of different metallic materials.

A washer according to the present invention includes a corrugated portion which includes a crest portion formed on each of an outer peripheral surface and an inner peripheral surface and a valley portion continuous to the crest portion in the circumferential direction, and each of the crest portion and the valley portion has an arc shape as viewed in a thickness direction.

Advantageous Effects of Invention

The effects of the present invention are as follows.

In the method of manufacturing a washer according to the present invention, a material yield can be improved and the longitudinal member can be easily bent.

In the method of manufacturing a washer according to the present invention, stress can be dispersed.

In the method of manufacturing a washer according to the present invention, stress can be dispersed in a wide range of the valley portion.

In the method of manufacturing a washer according to the present invention, the longitudinal member can be smoothly deformed.

In the method of manufacturing a washer according to the present invention, lubricity can be improved.

In the method of manufacturing a washer according to the present invention, a material yield can be effectively improved.

In the method of manufacturing a washer according to the present invention, peeling of the metallic materials can be suppressed.

In the washer according to the present invention, a material yield can be improved and lubricity can be effectively improved.

DESCRIPTION OF EMBODIMENT

In the following, a description will be given where directions indicated by arrows U, D, F, B, L and R in the drawings are defined as up, down, front, rear, left, and right directions, respectively.

Hereinafter, a method of manufacturing a washer 10 and the washer 10 according to an embodiment of the present invention will be described.

Figure 6:
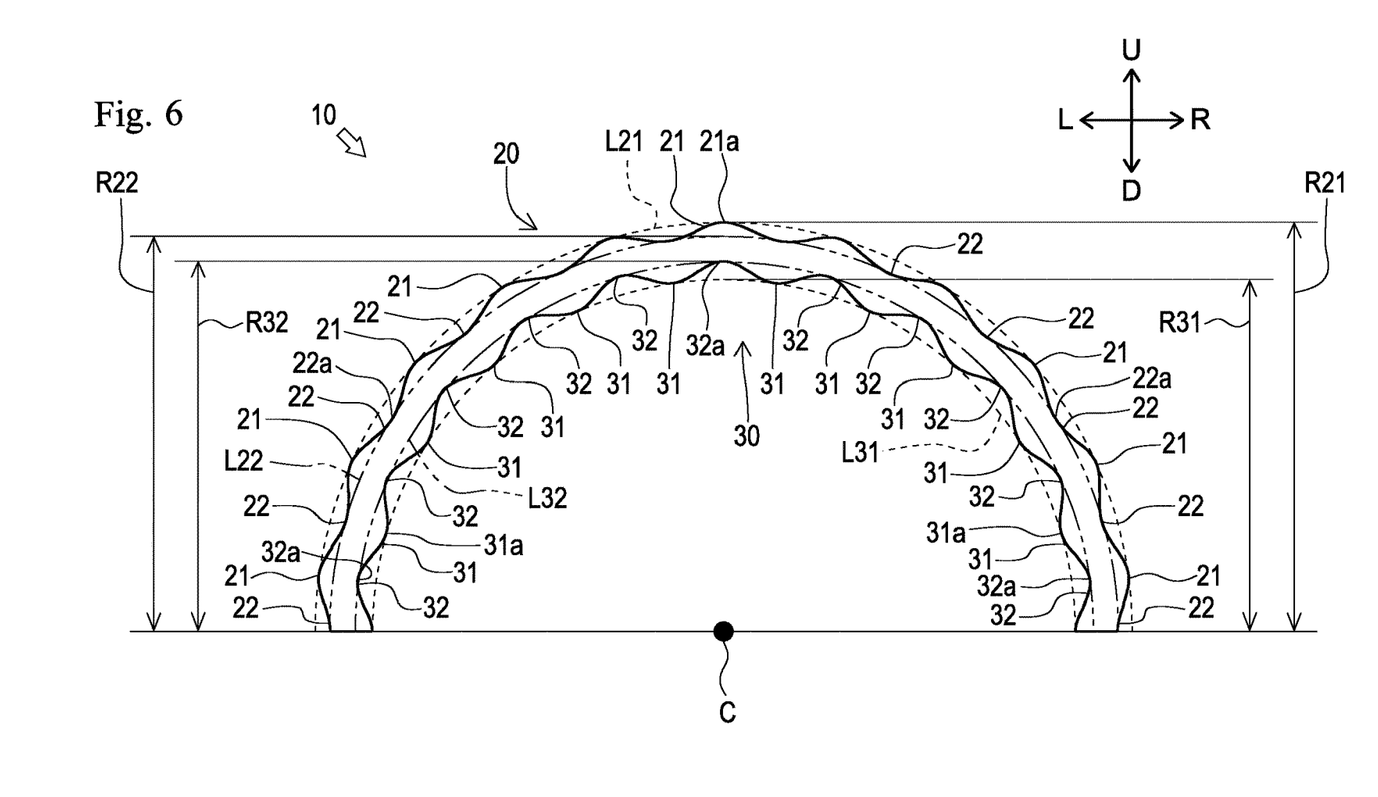
FIG. 6 is a front view illustrating a manufactured washer.

The washer 10 illustrated in FIG. 6 is a member for appropriately receiving a load. The washer 10 is formed into a semicircular shape (arcuate shape) in front view. The washer 10 according to the present embodiment includes a bimetal material (bimetal material formed by bonding two kinds of metallic materials together) in which different metallic materials are bonded on the front surface and the rear surface. The method of manufacturing the washer 10 is for manufacturing the washer 10 as described above.

Figure 1:
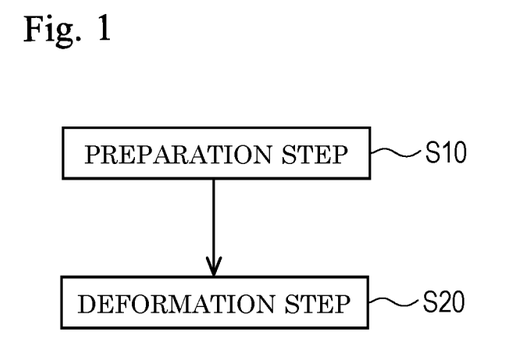
FIG. 1 is a flowchart of a method of manufacturing a washer according to an embodiment of the present invention.
Figure 2:
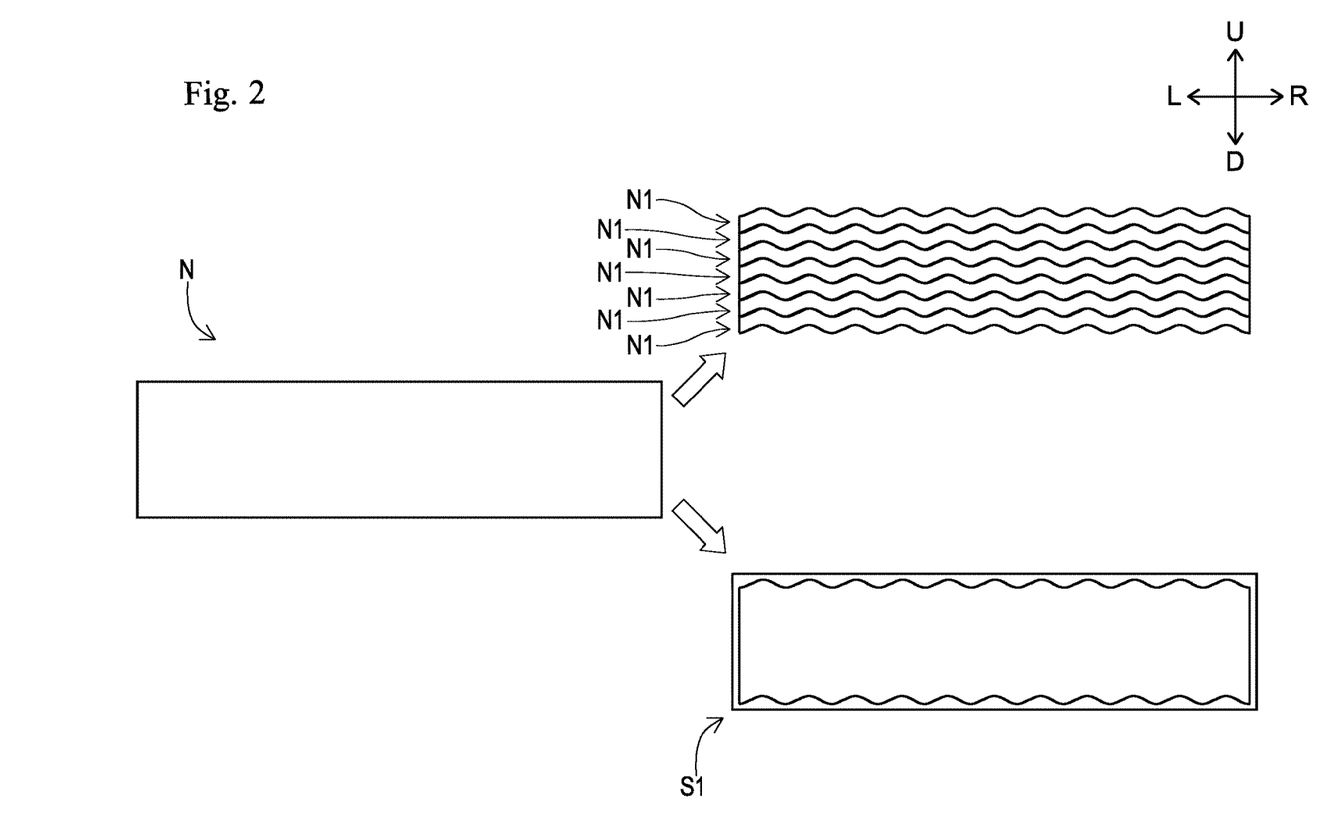
FIG. 2 is a view illustrating a state of punching a plate member.

As illustrated in FIG. 1, first, in the method of manufacturing the washer 10, a preparation step is performed (step S10). In the preparation step, a plate member N illustrated in FIG. 2 is processed to prepare a longitudinal member N1. As illustrated in FIG. 2, the plate member N is a member disposed such that plate faces are directed the front and the rear and the longitudinal direction matches the right-left direction. The plate member N includes the bimetal material. In the preparation step, the plate member N is subjected to a blanking process, which is a process in which a plate face is punched with a predetermined die. Thus, the plate member N is divided into a plurality (seven in the present embodiment) of longitudinal members N1 and one scrap S1.

Figure 3:
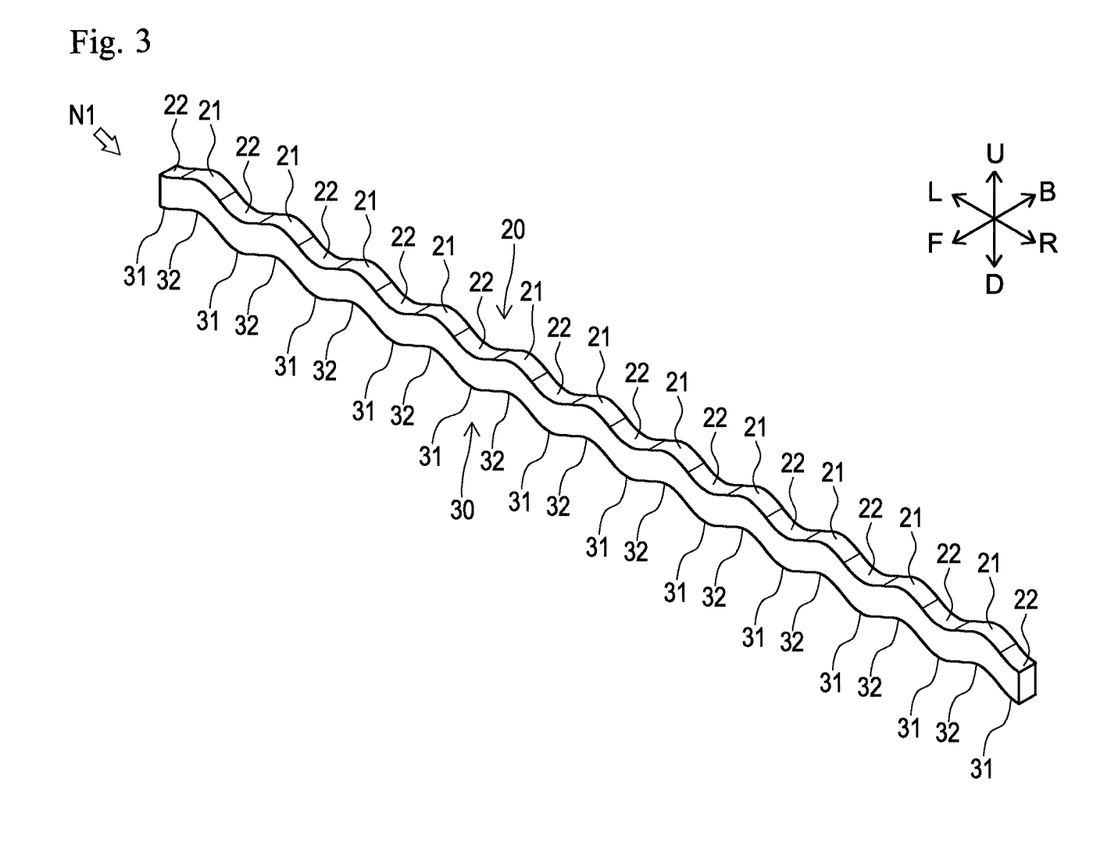
FIG. 3 is a perspective view illustrating a prepared longitudinal member.
Figure 4A:
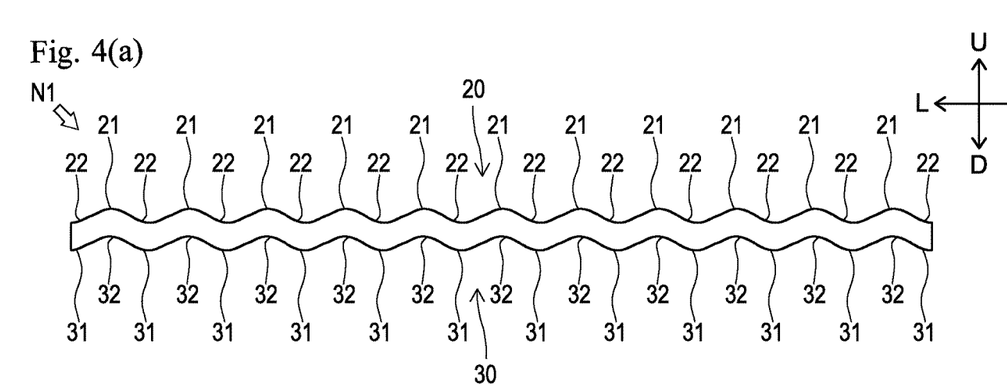
FIG. 4(a) is a front view illustrating the prepared longitudinal member.
Figure 4B:
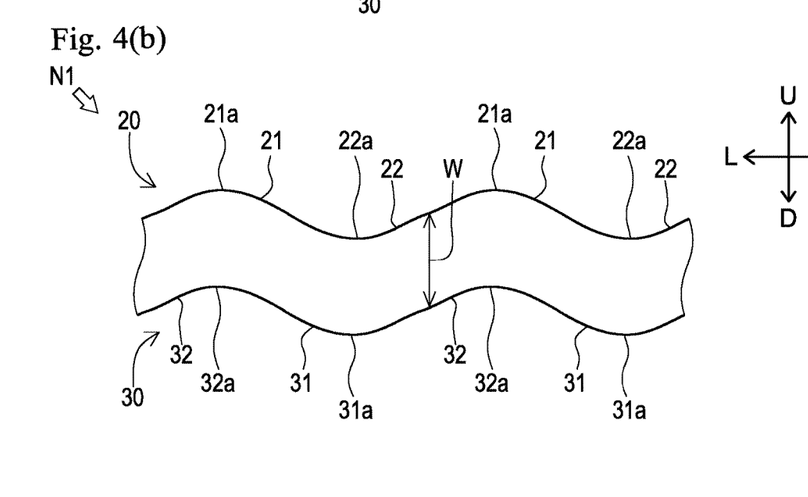
FIG. 4(b) is an enlarged front view illustrating a corrugated portion.

As illustrated in FIGS. 3, 4(a), and 4(b), the longitudinal member N1 prepared in the preparation step is disposed such that the longitudinal direction matches the right-left direction. In addition, the longitudinal member N1 is disposed such that the lateral direction matches the up-down direction. The longitudinal member N1 includes an upper corrugated portion 20 and a lower corrugated portion 30.

The upper corrugated portion 20 is formed on the upper surface of the longitudinal member N1. The upper corrugated portion 20 has a crest portion 21 and a valley portion 22.

The crest portion 21 is a portion formed so as to protrude upward (in the lateral direction) on the upper surface of the longitudinal member N1. The tip portion (top portion) 21a of the crest portion 21 is formed into a substantially arc shape in front view. The crest portion 21 is formed to extend from the front end to the rear end (the front surface to the rear surface) of the longitudinal member N1. The plurality of (11 in the present embodiment) crest portions 21 is formed in the right-left direction with the valley portion 22 to be described later interposed between the crest portions 21.

The valley portion 22 is a portion formed to be recessed downward (in the lateral direction) on the upper surface of the longitudinal member N1. The plurality of (12 in the present embodiment) valley portions 22 is formed such that the valley portions 22 are continuous to the crest portions 21 in the right-left direction. The valley portions 22 (excluding the valley portions 22 located at the left end and the right end) disposed in the middle portion in the right-left direction are formed such that each valley portion 22 has an outer shape substantially identical to the outer shape of the crest portion 21 (the size in the right-left direction, the size in the up-down direction, and the shape of the tip portion (bottom portion) 22a are substantially identical). The valley portion 22 disposed at the left end is formed in a substantially arc shape in front view obtained by cutting off the left half of the valley portion 22 disposed at the middle portion in the right-left direction. The valley portion 22 disposed at the right end is formed in a substantially arc shape in front view obtained by cutting off the right half of the valley portion 22 disposed at the middle portion in the right-left direction. The valley portion 22 is formed to extend from the front end to the rear end (the front surface to the rear surface) of the longitudinal member N1.

The upper corrugated portion 20 as configured above is formed to extend from the left end to the right end on the upper surface of the longitudinal member N1. Thus, the upper surface of the longitudinal member N1 is formed such that the crest portions 21 and the valley portions 22 are alternately and continuously formed over the entire surface, and is formed to have a substantially sinusoidal shape in front view.

The lower corrugated portion 30 is formed on the lower surface of the longitudinal member N1. The lower corrugated portion 30 has a crest portion 31 and a valley portion 32.

The crest portion 31 is a portion formed so as to protrude downward (in the lateral direction) on the lower surface of the longitudinal member N1. The plurality of (12 in the present embodiment) crest portions 31 is formed in the right-left direction with the valley portion 32 of the lower corrugated portion 30 to be described later interposed between the crest portions 31. The crest portions 31 (excluding the crest portions 31 located at the right end and the left end) disposed in the middle portion in the right-left direction are formed such that each crest portion 31 has an outer shape substantially identical to the outer shape of the valley portion 22 of the upper corrugated portion 20 (the size in the right-left direction, the size in the up-down direction, and the shape of the tip portion (top portion) 31a are substantially identical). The crest portion 31 disposed at the left end is formed into a substantially arc shape in front view obtained by cutting off the left half of the crest portion 31 disposed at the middle portion in the right-left direction. The crest portion 31 disposed at the right end is formed into a substantially arc shape in front view obtained by cutting off the right half of the crest portion 31 disposed at the middle portion in the right-left direction. The crest portion 31 is formed to extend from the front end to the rear end (the front surface to the rear surface) of the longitudinal member N1. The crest portion 31 is disposed below the valley portion 22 of the upper corrugated portion 20. That is, the crest portion 31 is disposed at a position shifted in the right-left direction with respect to the crest portion 21 of the upper corrugated portion 20.

The valley portion 32 is a portion formed to be recessed upward (in the lateral direction) on the lower surface of the longitudinal member N1. The valley portion 32 is formed so as to have an outer shape substantially identical to the outer shape of the crest portion 21 of the upper corrugated portion 20 (the size in the right-left direction, the size in the up-down direction, and the shape of the tip portion (bottom portion) 32a are substantially identical). The plurality of (11 in the present embodiment) valley portions 32 is formed such that the valley portions 32 are continuous to the crest portions 31 in the right-left direction. The valley portion 32 is formed to extend from the front end to the rear end (the front surface to the rear surface) of the longitudinal member N1.

Each valley portion 32 is disposed below each crest portion 21 of the upper corrugated portion 20. That is, the valley portion 32 is disposed at a position shifted in the right-left direction with respect to the valley portion 22 of the upper corrugated portion 20.

The lower corrugated portion 30 as configured above is formed to extend from the left end to the right end on the lower surface of the longitudinal member N1. Thus, the lower surface of the longitudinal member N1 is formed such that the crest portions 31 and the valley portions 32 of the lower corrugated portion 30 are alternately and continuously formed over the entire surface, and is formed to have a substantially sinusoidal shape in front view.

In addition, in the longitudinal member N1, the crest portions 21 of the upper corrugated portion 20 and the valley portions 32 of the lower corrugated portion 30 are disposed so as to be aligned with each other in the right-left direction, and the positions of the valley portions 22 of the upper corrugated portion 20 and the crest portions 31 of the lower corrugated portion 30 are aligned with each other in the right-left direction. Thus, the longitudinal member N1 is formed in a substantially sinusoidal shape in front view such that a width W in the up-down direction (the distance from the upper surface to the lower surface along the up-down direction) is always constant. Thus, the upper surface and the lower surface of the longitudinal member N1 are formed to have substantially identical shapes.

In addition, the distance along the up-down direction from the valley portion 22 of the upper corrugated portion 20 to the valley portion 32 of the lower corrugated portion 30 is formed to be about a half of the width W in the up-down direction.

Therefore, the longitudinal member N1 according to the present embodiment can be reduced in volume, and therefore reduced in weight.

As illustrated in FIG. 1, after the preparation step is performed, a deformation step is performed (step S20) in the method of manufacturing the washer 10. The deformation step is a step of plastically deforming the longitudinal member N1. In the deformation step, the longitudinal member N1 is restrained by a predetermined jig. Then, as illustrated in FIG. 5(b), the right portion and the left portion of the longitudinal member N1 are bent to the lower side (toward point C disposed below the longitudinal member N1). Thus, the longitudinal member N1 is plastically deformed into a semicircular shape in front view with point C as the center. Thus, the longitudinal member N1 is formed into the washer 10. On the outer peripheral surface of the washer 10, the upper corrugated portion 20 is disposed. In addition, on the inner peripheral surface of the washer 10, the lower corrugated portion 30 is disposed.

When such a deformation step is performed, the crest portions 21 and the valley portions 22 of the upper corrugated portion 20 are elongated in the circumferential direction of the washer 10. In addition, at that time, stress tends to act on the valley portions 22 (particularly, the tip portions 22a). Therefore, as illustrated in FIGS. 5(b) and 6, on the outer peripheral surface (the upper surface of the longitudinal member N1) of the washer 10, the valley portions 22 are mainly elongated.

An imaginary line L21 indicated by a broken line in FIG. 6 is a curve connecting the tip portions 21a of the crest portions 21 of the upper corrugated portion 20. An imaginary line L22 indicated by an alternate long and two short dashes line in FIG. 6 is a curve connecting the tip portions 22a of the valley portions 22 of the upper corrugated portion 20. An imaginary line L31 indicated by a broken line in FIG. 6 is a curve connecting the tip portions 31a of the crest portions 31 of the lower corrugated portion 30. An imaginary line L32 indicated by an alternate long and two short dashes line in FIG. 6 is a curve connecting the tip portions 32a of the valley portions 32 of the lower corrugated portion 30. Each of the imaginary lines L21, L22, L31, and L32 are formed in a semicircular shape in front view with point C as the center.

A radius R21 illustrated in FIG. 6 is the radius of the imaginary line L21 (distance along the radial direction from point C to the tip portion 21a of the crest portion 21 of the upper corrugated portion 20). A radius R22 illustrated in FIG. 6 is the radius of the imaginary line L22 (distance along the radial direction from point C to the tip portion 22a of the valley portion 22 of the upper corrugated portion 20). A radius R31 illustrated in FIG. 6 is the radius of the imaginary line L31 (distance along the radial direction from point C to the tip portion 31a of the crest portion 31 of the lower corrugated portion 30). A radius R32 illustrated in FIG. 6 is the radius of the imaginary line L32 (distance along the radial direction from point C to the tip portion 32a of the valley portion 32 of the lower corrugated portion 30).

Since the longitudinal member N1 includes the valley portion 22 of the upper corrugated portion 20, the vicinity of the tip portion 22a of the valley portion 22 is most likely to be deformed. That is, in the deformation step, not the crest portion 21 but the vicinity of the tip portion 22a of the valley portion 22 mainly deforms (stretches). When this portion (the vicinity of the tip portion 22a of the valley portion 22) is focused on, since the valley portion 22 is provided, the radius of curvature of deformation in the deformation step is not the radius R21 of the imaginary line L21 but the radius R22 of the imaginary line L22 smaller than the radius R21. That is, the curvature of the longitudinal member N1 on the outer peripheral side can be increased. Since the deformation step as described above is performed, the valley portion 22 is opened larger (wider than the valley portion 22 before the deformation step is performed).

In addition, when the deformation step is performed, the crest portion 31 and the valley portion 32 of the lower corrugated portion 30 are compressed in the circumferential direction of the washer 10. In addition, at that time, stress is likely to act on the valley portion 32 (particularly, the tip portion 32a). Therefore, the valley portion 32 is mainly compressed on the lower surface of the longitudinal member N1.

Since the longitudinal member N1 includes the valley portion 32 of the lower corrugated portion 30, the vicinity of the tip portion 32a of the valley portion 32 is most likely to be deformed. That is, in the deformation step, not the crest portion 31 but the vicinity of the tip portion 32a of the valley portion 32 mainly deforms (is compressed). When this portion (the vicinity of the tip portion 32a of the valley portion 32) is focused on, since the valley portion 32 is provided, the radius of curvature of deformation in the deformation step is not the radius R31 of the imaginary line L31 but the radius R32 of the imaginary line L32 greater than the radius R31. That is, in the longitudinal member N1, the curvature on the inner peripheral side can be decreased. Since the deformation step as described above is performed, the valley portion 32 is opened less (more compressed than the valley portion 32 before the deformation step is performed).

As described above, in the washer 10 according to the present embodiment, the difference in curvature between the outer peripheral side and the inner peripheral side can be reduced. Thereby, the longitudinal member N1 can be easily (with small force) bent, as in the case of bending a thin member (a member having a rectangular shape in front view having a width in the up-down direction shorter than the width W in the up-down direction.

In addition, since the crest portions 21, 31 of the upper corrugated portion 20 and the lower corrugated portion 30 are formed on the outer peripheral surface and the inner peripheral surface of the washer 10, respectively, it is possible to increase the areas of the front surface and the rear surface of the washer 10. Therefore, even if the valley portions 22, 32 are formed and the areas of the front surface and the rear surface of the washer 10 are reduced, the influence of the decrease in the areas can be reduced by the crest portions 21, 31. Thus, a decrease in sliding area of the washer 10 can be suppressed.

Figure 5A:
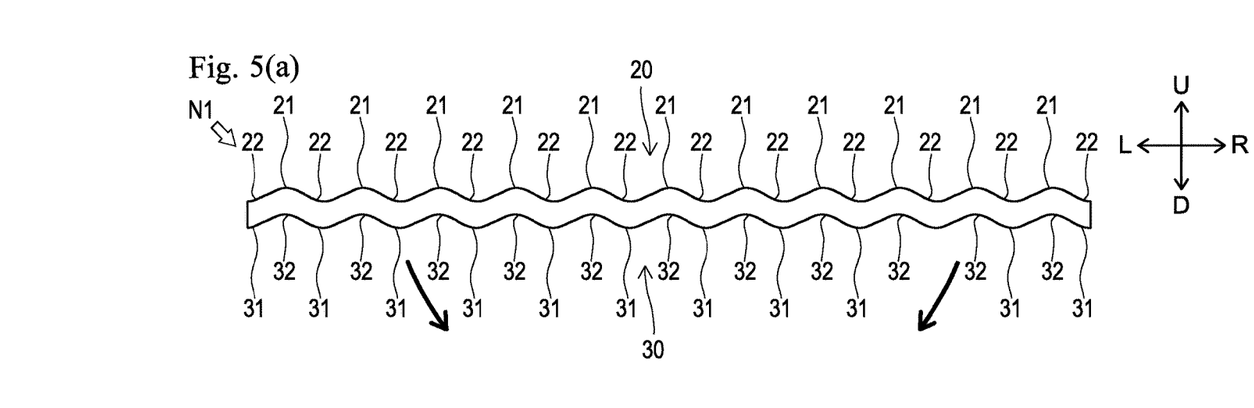
FIG. 5(a) is a view illustrating a state in which a longitudinal member is to be deformed.
Figure 5B:
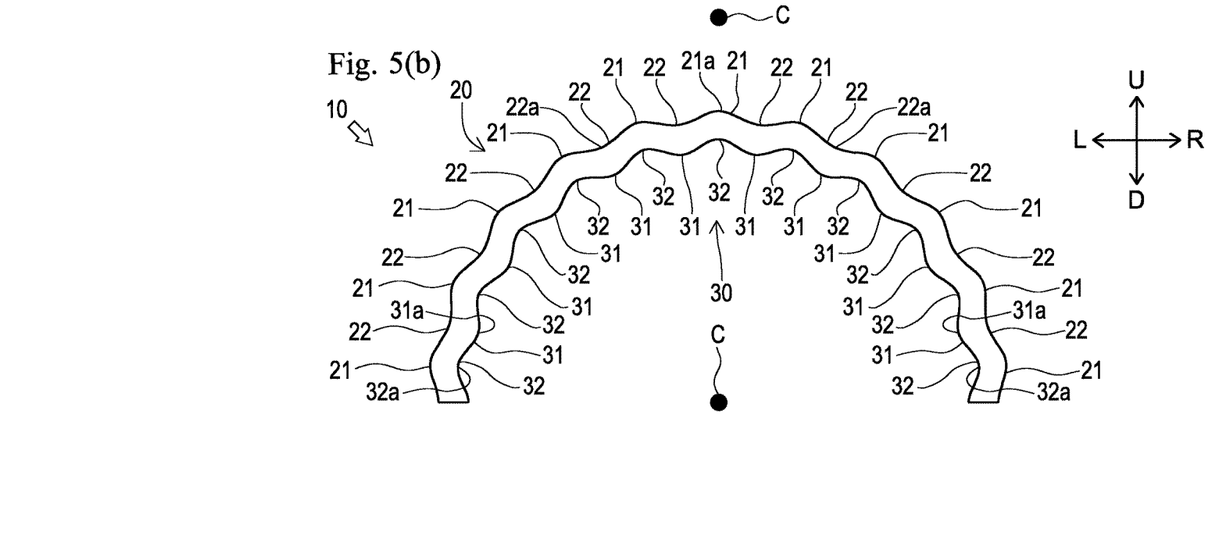
FIG. 5(b) is a view illustrating the deformed longitudinal member.

As illustrated in FIGS. 5(a) and 5(b), since the valley portions 32 of the lower corrugated portion 30 are formed on the inner peripheral surface (lower surface) of the washer 10 (longitudinal member N1), clearance is provided on the inner peripheral surface (lower surface). Thus, in the washer 10 (longitudinal member N1), a relief margin in the deformation step (compression) is secured. Therefore, in the deformation step, the lower surface of the longitudinal member N1 can be deformed smoothly. Therefore, since it is possible to suppress swelling of the front surface and the rear surface of the washer 10, the quality can be improved.

Thus, manufacture of the washer 10 is completed.

One semicircular washer 10 manufactured as described above is abutted against circumferential end portions of another semicircular washer 10. The one semicircular washer 10 is joined to the other semicircular washer 10 by appropriate means such as laser welding. The joined washer 10 is formed into an annular shape and is provided in an appropriate member (for example, a housing for supporting a shaft member). In this state, the washer 10 can receive a load (for example, a load in the axial direction from the shaft member). In addition, the surface of the washer 10 can slide with respect to the shaft member. Lubricant is fed from a predetermined lubricant passage to the valley portions 22, 32 of the upper corrugated portion 20 and the lower corrugated portion 30 of the washer 10. The lubricant is held in the valley portions 22 and 32.

Thus, the valley portions 22, 32 of the upper corrugated portion 20 and the lower corrugated portion 30 can function as oil reservoirs in the washer 10. Therefore, lubricity can be improved. In particular, since the washer 10 can hold a large quantity of lubricant in the largely opened valley portions 22, lubricity can be effectively improved.

By using the method of manufacturing the washer 10 according to the present embodiment, it is possible to punch the plate member N in a state where the longitudinal members N1 are disposed in the up-down direction in the preparation step (see FIG. 2). That is, according to the method of manufacturing the washer 10, it is possible to punch the plate member N substantially linearly. Therefore, according to the method of manufacturing the washer 10, it is possible to punch the plate member N substantially without any clearance, and a material yield can be improved (see the scrap S1 illustrated in FIG. 2 and the scrap S901 illustrated in FIG. 9).

In particular, since the upper surface and the lower surface of the longitudinal member N1 according to the present embodiment are formed into substantially identical shapes, the longitudinal members N1 can be disposed without clearance between the longitudinal members N1 in the up-down direction in a state where the positions in the right-left direction are aligned, as illustrated in FIG. 2. Therefore, when the plate member N is punched in the preparation step, there is no need to provide clearance along the up-down direction between the longitudinal members N1.

In addition, the longitudinal members N1 can be disposed without clearance between the longitudinal members N1 in the up-down direction in a state where the positions in the right-left direction are aligned. Therefore, it is possible to punch the plate member N without substantially wasting the left end portion and the right end portion of the plate member N. Therefore, the material yield can be effectively improved.

Further, as illustrated in FIGS. 4(a), 4(b), 5(a), and 5(b), since the longitudinal member N1 according to the present embodiment is formed such that the width W in the up-down direction is always constant, it is possible to prevent rigidity from locally decreasing. Therefore, strength of the washer 10 can be improved.

In addition, by bending the longitudinal member N1 in which the valley portions 22 of the upper corrugated portion 20 and the valley portions 32 of the lower corrugated portion 30 are disposed so as to be shifted from each other in the right-left direction, the valley portions 22 and the valley portions 32 can be shifted from each other in the circumferential direction in the washer 10. Thus, the valley portions 22 and the valley portions 32, that is, the portions where stress is likely to act, can be moved away from each other. Therefore, strength of the washer 10 can be improved.

In addition, since the upper corrugated portion 20 and the lower corrugated portion 30 according to the present embodiment are formed to extend from the right end to the left end of the longitudinal member N1, more crest portions 21, 31 and more valley portions 22, 32 are formed on the upper surface and the lower surface. Therefore, in the longitudinal member N1 (the washer 10), it is possible to disperse stress to the many valley portions 22, 32 in the deformation step. In addition, in the longitudinal member N1 (the washer 10), the influence of the decrease in the areas of the front surface and the rear surface can be reduced by the crest portions 21, 31. Thus, strength of the washer 10 can be enhanced and a decrease in the sliding area of the washer 10 can be suppressed.

In addition, in the valley portions 22, 32 of the upper corrugated portion 20 and the lower corrugated portion 30 according to the present embodiment, the tip portions 22a, 32a are formed into a substantially arc shape (a shape without a sharp portion) in front view. Therefore, in the washer 10, stress can be dispersed to the entire tip portions 22a, 32a of the valley portions 22, 32. Therefore, strength of the washer 10 can be improved.

In addition, the upper corrugated portion 20 and the lower corrugated portion 30 of the longitudinal member N1 according to the present embodiment are formed into a substantially sinusoidal shape in front view. Therefore, in the upper corrugated portion 20 and the lower corrugated portion 30, stress can be dispersed to the entire tip portions 21a, 31a of the crest portions 21, 31. Therefore, strength of the washer 10 can be improved. In addition, the longitudinal member N1 can be bent smoothly.

As described above, the longitudinal member N1 (washer 10) according to the present embodiment includes a bimetal material in which the different metallic materials are bonded on the front surface and the rear surface. In this case, the longitudinal member N1 is configured such that the deformation amount (elongation amount and compression amount) with respect to a bending load differs between the front surface and the rear surface. In a case where the longitudinal member N1 as described above is bent, if the upper surface is greatly elongated and the lower surface is greatly compressed, the difference in deformation amount between the upper surface and the lower surface becomes great, and the metallic materials may peel off.

In the longitudinal member N1 according to the present embodiment, since the curvature of the outer peripheral side is increased by the valley portions 22 of the upper corrugated portion 20, the elongation amount on the outer peripheral side (upper surface) can be reduced. In addition, in the longitudinal member N1, since the curvature of the inner peripheral side is decreased by the valley portions 32 of the lower corrugated portion 30, the compression amount on the inner peripheral surface (lower surface) can be reduced. That is, by reducing the difference in the curvature between the outer peripheral side and the inner peripheral side of the longitudinal member N1, the difference in the deformation amount between the outer peripheral side and the inner peripheral side can be reduced. Therefore, in the longitudinal member N1, peeling of the bimetal material can be suppressed.

As described above, the method of manufacturing the washer 10 according to the present embodiment includes: a preparation step of preparing the longitudinal member N1 that includes the upper corrugated portion 20 and the lower corrugated portion 30 (corrugated portion) having the crest portions 21, 31 formed on at least one of the upper surface (one side surface in the lateral direction) and the lower surface (the other side surface) and the valley portions 22, 32 continuous to the crest portions 21, 31 in the right-left direction (longitudinal direction); and a deformation step of deforming the longitudinal member N1 so that the upper surface and the lower surface are arcuate as viewed in the direction from the front to the rear (one direction) orthogonal to the up-down direction (lateral direction) and to the right-left direction.

Such a configuration enables the material yield to be improved.

The upper corrugated portion 20 or the lower corrugated portion 30 are formed to extend from the left end (one end in the longitudinal direction) to the right end (the other end) on at least one of the upper surface and the lower surface of the longitudinal member N1 prepared in the preparation step.

Such a configuration enables stress to be dispersed.

The valley portions 22, 32 of the longitudinal member N1 prepared in the preparation step are formed such that the tip portions 22a, 32a have an arc shape as viewed in the direction from the front to the rear.

Such a configuration enables stress to be dispersed in a wide range of the valley portions 22, 32.

The upper corrugated portion 20 and the lower corrugated portion 30 of the longitudinal member N1 prepared in the preparation step are formed to have a sinusoidal shape as viewed in the direction from the front to the rear.

Such a configuration enables the longitudinal member N1 to be smoothly deformed.

In the deformation step, the longitudinal member N1 is deformed so that the upper corrugated portion 20 or the lower corrugated portion 30 is disposed at least on the outer peripheral side.

Such a configuration enables lubricity to be improved.

The upper surface and the lower surface of the longitudinal member N1 prepared in the preparation step are formed such that the distance along the up-down direction from the upper surface to the lower surface is constant from the left end to the right end.

Such a configuration enables the material yield to be effectively improved.

The longitudinal member N1 prepared in the preparation step includes a bimetal material made of a plurality of different metallic materials.

Such a configuration enables suppression of peeling of the metallic material.

The washer 10 according to the present embodiments includes the upper corrugated portion 20 and the lower corrugated portion 30 (corrugated portion) including the crest portions 21, 31 formed on at least one of the outer peripheral surface and the inner peripheral surface and the valley portions 22, 32 continuous to the crest portions 21, 31 in the circumferential direction.

Such a configuration enables the material yield to be improved.

Note that the upper corrugated portion 20 and the lower corrugated portion 30 according to the present embodiment are an embodiment of the corrugated portion according to the present invention.

The upper surface of the longitudinal member N1 according to the present embodiment is an embodiment of one side surface of the longitudinal member according to the present invention.

The lower surface of the longitudinal member N1 according to the present embodiment is an embodiment of the other side surface of the longitudinal member according to the present invention.

The up-down direction in the present embodiment corresponds to the lateral direction according to the present invention.

The right-left direction in the present embodiment corresponds to the longitudinal direction according to the present invention.

The direction from the front to the rear in the present embodiment corresponds to the one direction according to the present invention.

The embodiment of the present invention has been described above; however, the present invention is not limited to the above configuration, and various modifications can be made within the scope described in the claims.

For example, the washer 10 is formed in a semicircular shape in front view; however, the shape of the washer according to the present invention is not limited to this. The washer according to the present invention may be configured of the longitudinal member N1 having an arcuate shape in front view with a central angle of 90°.

The longitudinal member N1 according to the present embodiment includes the upper corrugated portion 20 and the lower corrugated portion 30; however, the longitudinal member according to the present invention may include at least one of the upper corrugated portion 20 and the lower corrugated portion 30. In such a case, it is preferable that the longitudinal member according to the present invention includes one of the upper corrugated portion 20 and the lower corrugated portion 30 disposed on the outer peripheral side in the deformation step. Therefore, in the longitudinal member according to the present invention, a valley portion can be largely opened in the deformation step. Therefore, the washer according to the present invention can hold a greater amount of lubricant and lubricity of the washer can be improved.

The upper corrugated portion 20 and the lower corrugated portion 30 of the longitudinal member N1 according to the present embodiment are formed to extend from the left end to the right end of the longitudinal member N1; however, the range in which the corrugated portion according to the present invention is formed is not limited to this. The corrugated portion according to the present invention may be formed only at a central portion in the right-left direction of the longitudinal member N1. In such a case, the portion of the longitudinal member N1 excluding the central portion in the right-left direction may be formed into a flat shape.

The heights and the sizes in the right-left direction of the crest portions 21, 31 of the upper corrugated portion 20 and the lower corrugated portion 30 according to the present invention are not limited to those in the present embodiment. The depths and the sizes in the right-left direction of the valley portions 22, 32 of the upper corrugated portion 20 and the lower corrugated portion 30 according to the present invention are not limited to those in the present embodiment.

Figure 7A:
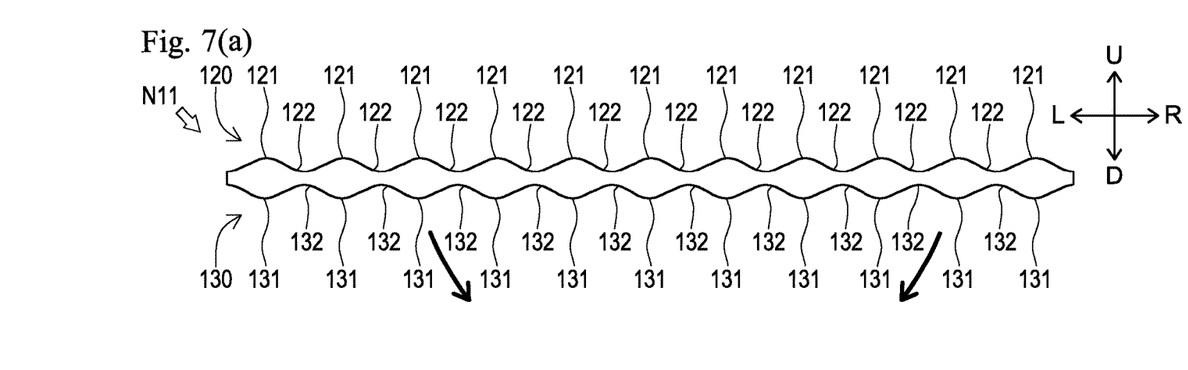
FIG. 7(a) is a view illustrating a state in which a longitudinal member according to a first modification is to be deformed.
Figure 7B:
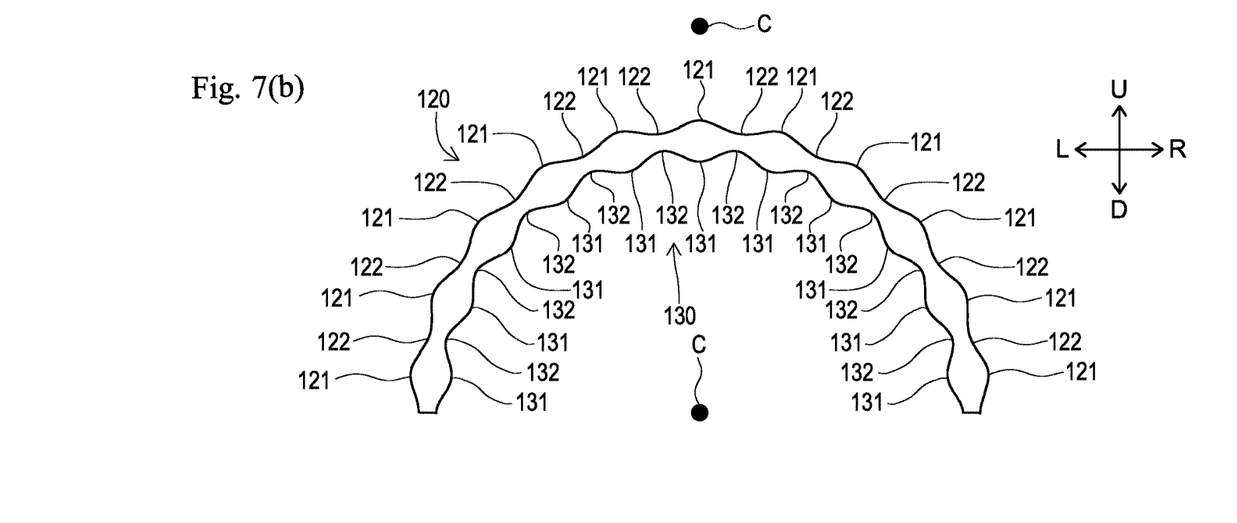
FIG. 7(b) is a view illustrating the deformed longitudinal member.

In the present embodiment, the crest portions 21 of the upper corrugated portion 20 and the valley portions 32 of the lower corrugated portion 30 are disposed so as to be aligned with each other in the right-left direction, and the valley portions 22 of the upper corrugated portion 20 and the crest portions 31 of the lower corrugated portion 30 are disposed so as to be aligned with each other in the right-left direction. However, the positional relationship between the crest portions and the valley portions of the corrugated portion according to the present invention is not limited to this. For example, as in an upper corrugated portion 120 and a lower corrugated portion 130 of a longitudinal member N11 according to a first modification illustrated in FIG. 7, the corrugated portion according to the present invention may be formed such that crest portions 121, 131 are disposed so as to be aligned with each other in the right-left direction, and valley portions 122, 132 are disposed so as to be aligned with each other in the right-left direction. Thus, the longitudinal member N11 can be bent with a smaller force than in the case of bending the longitudinal member N1 according to the present embodiment.

Figure 8A:
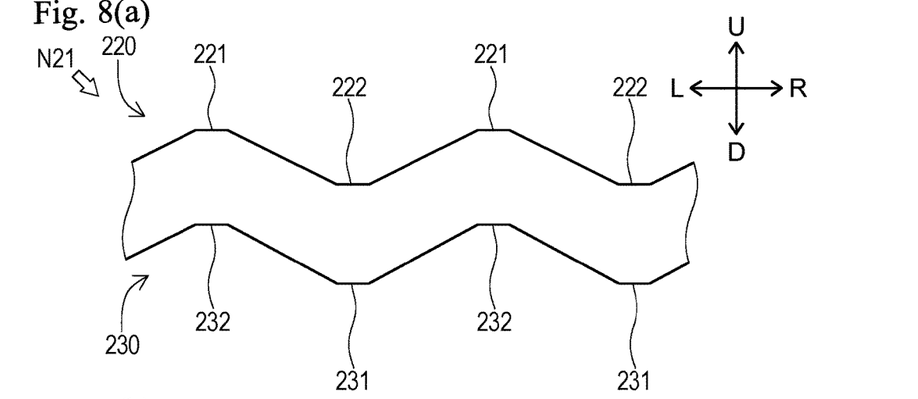
FIG. 8(a) is an enlarged front view illustrating a corrugated portion of a longitudinal member according to a second modification.

The upper corrugated portion 20 and the lower corrugated portion 30 according to the present embodiment are formed into a substantially sinusoidal shape in front view; however, the shape of the corrugated portion according to the present invention is not limited to this. For example, as in an upper corrugated portion 220 and a lower corrugated portion 230 of a longitudinal member N21 according to a second modification illustrated in FIG. 8(a), the corrugated portion according to the present invention may be formed such that crest portions 221, 231 and valley portions 222, 232 formed into a substantially trapezoidal shape in front view are alternately and continuously formed. In the corrugated portion according to the present invention, crest portions and valley portions formed into a substantially rectangular shape in front view are alternately and continuously formed.

Figure 8B:
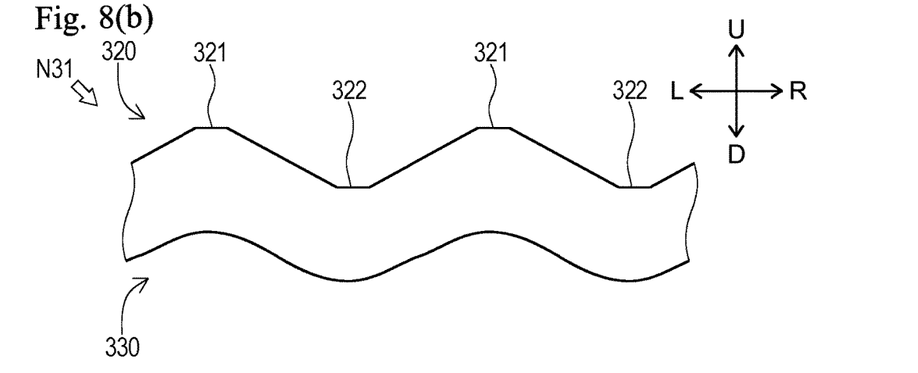
FIG. 8(b) is an enlarged front view illustrating a corrugated portion of a longitudinal member according to a third modification.

The upper corrugated portion 20 and the lower corrugated portion 30 according to the present embodiment have substantially identical shapes; however, the corrugated portion according to the present invention is not limited to this. The upper surface and the lower surface may have different shapes. For example, as in a longitudinal member N31 according to a third modification illustrated in FIG. 8(b), the corrugated portion according to the present invention may include an upper corrugated portion 320 in which crest portions 321 and valley portions 322 formed into a substantially trapezoidal shape in front view are alternately and continuously formed and a lower corrugated portion 330 formed into a substantially sinusoidal shape in front view.

Figure 8C:
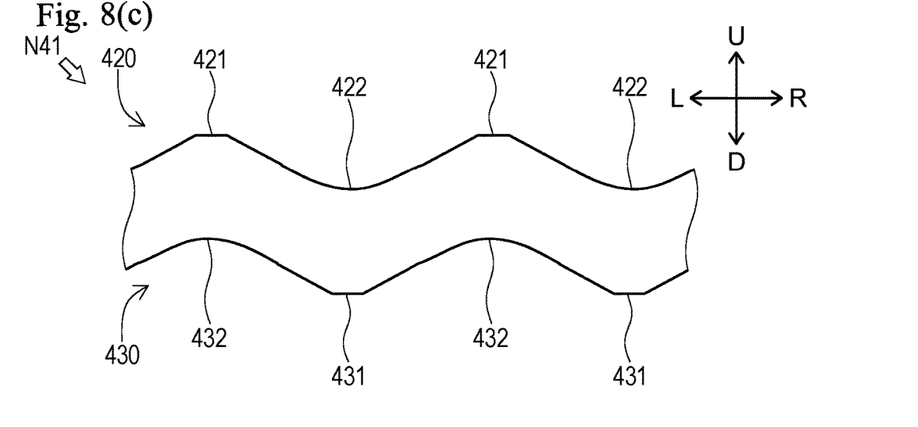
FIG. 8(c) is an enlarged front view illustrating a corrugated portion of a longitudinal member according to a fourth modification.

The crest portion 21 and the valley portion 22 of the upper corrugated portion 20 according to the present embodiment have substantially identical shapes; however, the crest portion and the valley portion of the corrugated portion according to the present invention may have different shapes. For example, as in an upper corrugated portion 420 and a lower corrugated portion 430 of a longitudinal member N41 according to a fourth modification illustrated in FIG. 8(c), the corrugated portion according to the present invention may include crest portions 421, 431 formed into a substantially trapezoidal shape in front view and valley portions 422, 432 formed into a substantially arc shape in front view.

All the crest portions 21 of the upper corrugated portion 20 according to the present embodiment have substantially identical shapes; however, the crest portions of the corrugated portion according to the present invention may have different shapes. That is, the corrugated portion according to the present invention may have a first crest portion formed into a substantially arc shape in front view and a second crest portion formed into a substantially trapezoidal shape in front view. This also applies to the valley portions of the corrugated portion according to the present invention.

The longitudinal member N1 according to the present embodiment includes a bimetal material formed by bonding two kinds of metallic materials together; however, the number of kinds of metallic materials of the bimetal material according to the present invention is not limited to this. The bimetal material according to the present invention may be obtained by bonding three or more kinds of metallic materials. The material which constitutes the longitudinal member according to the present invention is not limited to a bimetal material, and may include an appropriate (one kind of) metallic material or the like.

INDUSTRIAL APPLICABILITY

The present invention can be applied to a method of manufacturing a washer for receiving a load and a washer.

REFERENCE SIGNS LIST

10: Washer
20: Upper corrugated portion (corrugated portion)
21: Crest portion
22: Valley portion
30: Lower corrugated portion (corrugated portion)
31: Crest portion
32: Valley portion
N1: Longitudinal member

The invention claimed is:

1. A washer, comprising:
a corrugated portion including a crest portion on each of an outer peripheral surface and an inner peripheral surface and a respective valley portion continuous to each crest portion in a circumferential direction, wherein the respective crest portion has a mountain shape as viewed in a thickness direction, and the respective valley portion has a valley shape as viewed in a thickness direction, the washer configured to receive a load in an axial direction from a shaft member and to slide with respect to the shaft member, and having a flat plate shape, and having a semi-annular shape as viewed in a thickness direction.

2. A method of manufacturing the washer according to claim 1, comprising:
a preparation step of preparing a longitudinal member which includes a corrugated portion that has a crest portion formed on each of one side surface and another side surface in a lateral direction so as to protrude outward as viewed in one direction orthogonal to the lateral direction and to the longitudinal direction and a valley portion continuous to the crest portion in a longitudinal direction so as to be recessed inward as viewed in the one direction, the crest portion formed on the one side surface and the valley portion formed on the other side surface having identical shapes, and the valley portion formed on the one side surface and the crest portion formed on the other surface having identical shapes; and
a deformation step of deforming the longitudinal member such that the one side surface and the other side surface are arcuate as viewed in the one direction.

3. The method of manufacturing a washer according to claim 2, wherein the corrugated portion is formed to extend from one end to the other end in the longitudinal direction on at least one of the one side surface and the other side surface of the longitudinal member prepared in the preparation step.

4. The method of manufacturing a washer according claim 2, wherein the valley portions of the longitudinal member prepared in the preparation step are formed such that a tip portion of the valley portions have an arc shape as viewed in the one direction.

5. The method of manufacturing a washer according to claim 2, wherein the corrugated portion of the longitudinal member prepared in the preparation step is formed into a sinusoidal shape as viewed in the one direction.

6. The method of manufacturing a washer according to claim 2, wherein in the deformation step, the longitudinal member is deformed so that the corrugated portion is disposed at least on an outer peripheral side.

7. The method of manufacturing a washer according to claim 2, wherein the one side surface and the other side surface of the longitudinal member prepared in the preparation step are formed such that a distance along the lateral direction from the one side surface to the other side surface is constant from one end to another end of the longitudinal member in the longitudinal direction.

8. The method of manufacturing a washer according to claim 2, wherein the longitudinal member prepared in the preparation step includes a bimetal material made of a plurality of different metallic materials.

* * * * *